United States Patent
Haag et al.

(10) Patent No.: US 8,233,919 B2
(45) Date of Patent: Jul. 31, 2012

(54) INTELLIGENTLY PROVIDING USER-SPECIFIC TRANSPORTATION-RELATED INFORMATION

(75) Inventors: Stephen Haag, Plano, TX (US); Carlos J. LeBrilla, Frisco, TX (US); Marc Rush, The Colony, TX (US); Linda Rolfes, Plano, TX (US)

(73) Assignee: HNTB Holdings Ltd., Kansas City, MO (US)

( * ) Notice: Subject to any disclaimer, the term of this patent is extended or adjusted under 35 U.S.C. 154(b) by 412 days.

(21) Appl. No.: 12/616,566

(22) Filed: Nov. 11, 2009

(65) Prior Publication Data
US 2011/0034183 A1  Feb. 10, 2011

Related U.S. Application Data

(60) Provisional application No. 61/232,467, filed on Aug. 9, 2009.

(51) Int. Cl.
*H04W 24/00* (2009.01)
(52) U.S. Cl. ........... 455/456.3; 455/404.2; 455/414.3; 701/414; 701/419; 340/995.13; 340/539.13
(58) Field of Classification Search ....... 455/456.1–457, 455/414.1–414.3; 701/414, 419; 340/995.13, 340/539.13
See application file for complete search history.

(56) References Cited

U.S. PATENT DOCUMENTS

| | | | | |
|---|---|---|---|---|
| 5,889,474 A * | 3/1999 | LaDue | ............ | 340/8.1 |
| 6,150,961 A * | 11/2000 | Alewine et al. | ............ | 340/995.1 |
| 6,195,609 B1 * | 2/2001 | Pilley et al. | ............ | 701/120 |
| 6,338,019 B1 * | 1/2002 | Duckeck | ............ | 701/517 |
| 6,389,288 B1 * | 5/2002 | Kuwahara et al. | ............ | 455/456.6 |
| 6,405,132 B1 * | 6/2002 | Breed et al. | ............ | 701/301 |
| 6,647,270 B1 * | 11/2003 | Himmelstein | ............ | 455/456.1 |
| 6,708,107 B2 * | 3/2004 | Impson et al. | ............ | 701/117 |
| 6,999,872 B2 * | 2/2006 | Fabian et al. | ............ | 701/414 |
| 7,054,645 B1 * | 5/2006 | Infosino | ............ | 455/456.1 |
| 7,062,379 B2 * | 6/2006 | Videtich | ............ | 701/414 |
| 7,107,063 B1 * | 9/2006 | Bates et al. | ............ | 455/456.1 |
| 7,174,154 B2 * | 2/2007 | Ehlers | ............ | 455/404.2 |
| 7,515,900 B2 * | 4/2009 | Van Camp | ............ | 455/404.2 |
| 7,999,701 B1 * | 8/2011 | Xu et al. | ............ | 340/994 |
| 8,036,678 B2 * | 10/2011 | Goldenberg et al. | ............ | 455/456.1 |
| 8,060,303 B2 * | 11/2011 | Bando et al. | ............ | 701/414 |
| 8,078,397 B1 * | 12/2011 | Zilka | ............ | 701/414 |
| 8,081,952 B2 * | 12/2011 | Thornton et al. | ............ | 455/410 |
| 2004/0024522 A1 * | 2/2004 | Walker et al. | ............ | 701/210 |
| 2007/0197217 A1 * | 8/2007 | Sutardja | ............ | 455/433 |
| 2010/0105418 A1 * | 4/2010 | Kaplan | ............ | 455/457 |
| 2010/0211300 A1 * | 8/2010 | Jaffe et al. | ............ | 701/119 |
| 2012/0109721 A1 * | 5/2012 | Cebon et al. | ............ | 705/13 |

OTHER PUBLICATIONS http://www.informationweek.com/news/personal_tech/gps/showArticle.jhtml?articleID=219400239, last visited Nov. 11, 2009.
http://www.waze.com/faq/technical_faq/, last visited Nov. 11, 2009.
http://www.kcscout.net/FAQ.aspx, last visited Nov. 11, 2009.
http://www.commuteview.net/CommuteView/MainDesktop.aspx, last visited Nov. 11, 2009.
No Author Listed, "Zoomsafer FAQ," www.zoomsafer.com/faq.aspx, 5 pages, Origination date: unknown, Print date: Mar. 9, 2010.

* cited by examiner

*Primary Examiner* — Sharad Rampuria
(74) *Attorney, Agent, or Firm* — Shook, Hardy & Bacon L.L.P.

(57) ABSTRACT

A method, system, and medium are provided for distributing transportation alerts to computing devices in accordance with factors, such as device-specific and location-specific factors. In embodiments of the present invention, travel alerts, including public alerts associated with certain areas, are formatted or held prior to delivery, based on safety concerns, legal requirements, device settings, or other considerations.

20 Claims, 9 Drawing Sheets class=\"UIRoundedImage_Image\" \/><img src=\"http:\/\/static.ak.xyzcdn.net\/rsrc.php\/z821J\/hash\/pic.png\" alt=\"\" class=\"UIRoundedImage_CornersSprite\" \/><\/span><\/a><\/div><div class=\"comment_content\" id=\"comment_box_193_2_3\" ><div class=\"comment_text\"><a href=\"http:\/\/www.socialnetworkingsite.com\/profile.php?id=12345678910&ref=nf\" <orgin: govt authorized>
"Amber alert for . . . ."

INTELLIGENTLY PROVIDING USER-SPECIFIC TRANSPORTATION-RELATED INFORMATION

CROSS-REFERENCE TO RELATED APPLICATIONS

This application claims the benefit of U.S. Provisional Application No. 61/232,467, filed Aug. 9, 2009, which is hereby incorporated by reference in its entirety.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In one embodiment of the present invention, a method of distributing traffic information includes receiving traffic information that is authorized by a transportation authority. Based on a location, it is determined that a mobile device is a candidate to receive an alert based on the traffic information, and an alert is created. A condition that is associated with the mobile device is detected. The condition is used to indicate the alert should be presented in an audio format, and the alert is distributed.

In another embodiment, a method of delivering an alert includes a vehicle in a location, where a transportation alert applies to the location. It is determined that a computing device in the vehicle is moving beyond a certain speed. Based on this movement, the transportation alert is presented as an audible alert using the computing device.

In another embodiment of the present invention, information is received that is intended for distribution to a vehicle. The vehicle is associated with an alert-presentation device. A current status of the alert-presentation device is received, and a traffic-alert is generated based on the status. The traffic-alert is communicated to the alert-presentation device, which is adapted to facilitate presenting the alert.

BRIEF DESCRIPTION OF THE SEVERAL VIEWS OF THE DRAWINGS

Illustrative embodiments of the present invention are described in detail below with reference to the attached drawing figures, and wherein:

FIG. 1A depicts illustrative code that includes a credentialed tag in accordance with embodiments of the present invention;

DETAILED DESCRIPTION

Figure 1:
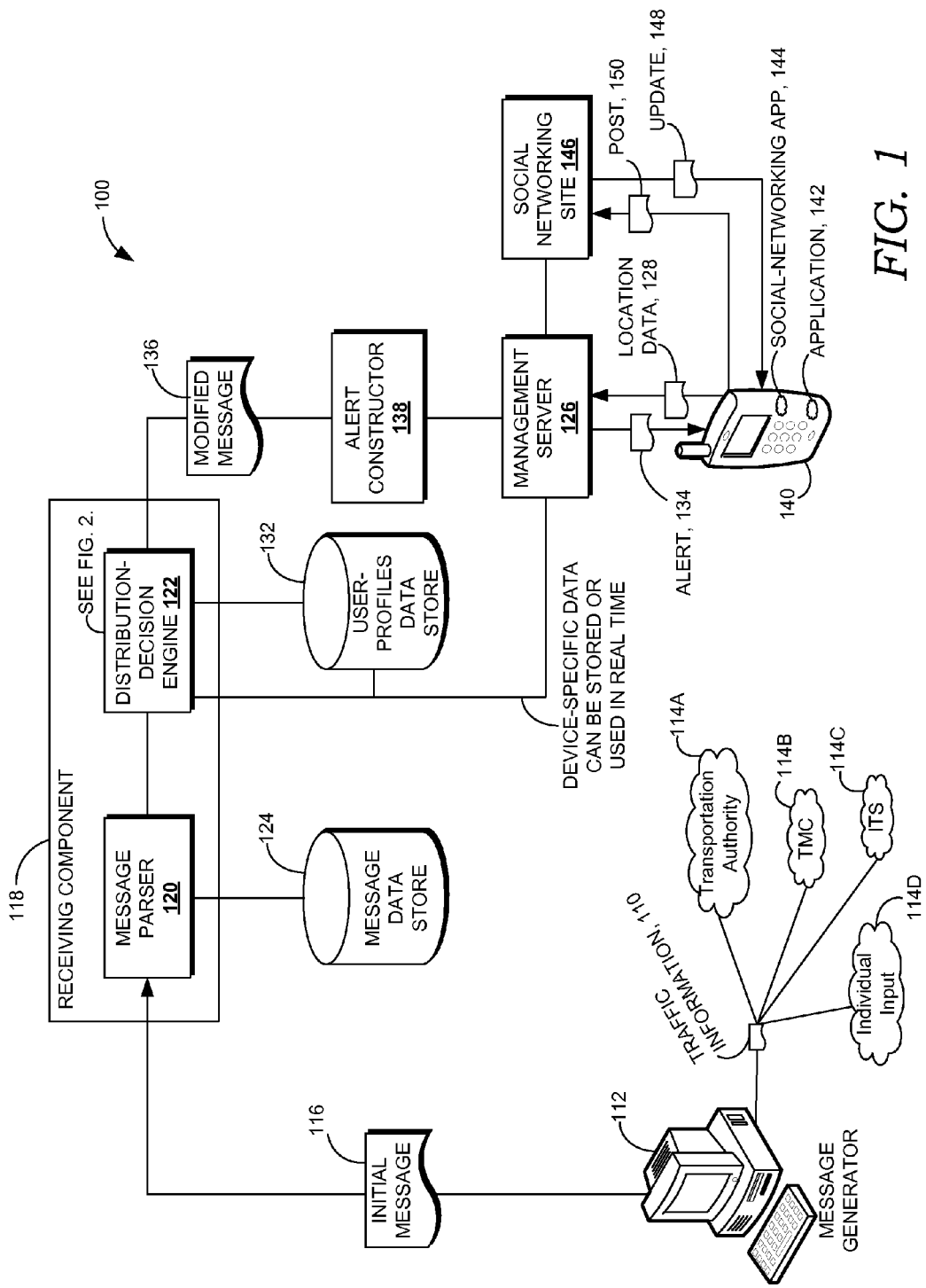
FIG. 1 is a block diagram illustrating exemplary devices suitable for operation of an embodiment of the present invention.

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

| | |
|---|---|
| AMBER | America's Missing: Broadcast Emergency Response |
| GPS | Global Positioning System |
| GIS | Geographic Information System |
| ISS | Information Station Specialists |
| ITS | Intelligent Transportation System |
| NTCIP | National Transportation Communications for ITS Protocol |
| PDA | Personal Data Assistant |
| PNT | Positioning, Navigation, and Timing |
| RTMS | Remote Traffic Microwave Sensor |
| TMC | Traffic Management Center |

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. Examples of stored information include computer-usable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

In embodiments of the present invention, transportation information, or traffic-system information, is communicated to mobile devices. A user may indicate a route or transportation plan, and receive relevant transportation information at a mobile device. Mobile devices provide positioning information that can be used to determine a location. In an example, a vehicle including a computing device may be too distant from a transportation event or device, such as a sign, to receive information directly; positioning data enables directing traffic information to the computing device in accordance with on or more factors.

Mobile devices enable positioning information to be determined during use, thereby permitting filtering, or other actions, to be performed on traffic-event information based on a location. Transportation information that is relevant to vehicles, based on a location, includes public alerts made for safety or notification purposes. Alerts include information related to recent criminal activity or potentially dangerous activities, for example, AMBER alerts, evacuation notices, precautionary and advisory notices from public officials, or from traffic- or condition-monitoring devices or organizations. Embodiments of the present invention include standards or protocols used with transportation devices, such as best practices used with respect to Intelligent Transportation Systems, traffic-management channels or centers, or other public-notification systems.

In order to provide safe alerts, one or more devices in a vehicle can be used to provide text-free alerts. In one example, when a vehicle is moving above a certain speed, a traffic-alert is configured to be delivered audibly. In some cases, a computing device receives a configured alert and directs the alert to a second device that has audio capabilities. The second device could be a hands-free headset or another speaker-equipped device within the vehicle.

FIG. 1 is a block diagram depicting an illustrative operating environment suitable for practicing embodiments of the present invention and is referenced generally by the numeral 100. Although we might address particular items in greater detail below, at the outset, to be clear, the various lines shown in FIG. 1 are not meant to convey hard boundaries. Indeed, demarcation of items/technologies are often grey, soft, and blurred. We show certain items in block-diagram form more for being able to reference something consistent with the nature of a patent than to imply that a certain component is or is not part of a certain device. Functionality matters more, which we describe. Similarly, although items are shown in the singular, plural items are contemplated as well (e.g., what is shown as one server might really be a bank of servers). Trying to visually convey this might obscure the invention. Thus, for readability, we show and reference items in the singular (while fully contemplating, where applicable, plural).

As illustratively shown in FIG. 1, traffic information 110 is received by a message generator 112. Transportation authorities provide or approve traffic information 110 in embodiments. Messages or databases that contain traffic information 110 can be authorized by transportation authorities, as shown by transportation authority 114A, including other agencies that provide or approve official transportation information. As depicted in FIG. 1, traffic management center ("TMC") 114B, intelligent transportation system ("ITS") 114C, and individual input 114D may also provide traffic information 110. We contemplate within the scope of "ITS" any system that monitors traffic and relays information about traffic to a distribution point (which, in one embodiment, is message generator 112).

Message generator 112 generates messages, such as initial message 116, that are received by receiving component 118 in FIG. 1. Initial message 116, generated by message generator 112, may reach receiving component 118 over a remote connection, or, in other embodiments of the present invention, message generator 112 may be at the same computing device as receiving component 118. Messages, including initial message 116, may be sent or received as one or more data packets, streams or files, such as text or audio files.

As shown in the exemplary operating environment of FIG. 1, receiving component 118 includes message parser 120 and distribution-decision engine 122 (variously referred to herein as a rules or decision engine or even "engine" for short). The message parser 120 receives initial messages (e.g., initial message 116), messages over a certain size, messages with more than one portion to be processed, or messages with tags, keywords, or other indicators, in embodiments of the present invention. Message parser 120 is part of decision engine 122 in an embodiment, or, alternatively, a message parser may be part of an interface or gateway between message generator 112 and decision engine 122.

FIG. 1 depicts message-data store 124 that stores message-related information. Message-related information is archived in the message-data store 124 in embodiments of the present invention. For example, message-related information can include messages, copies of messages, or aspects or portions, or copies of portions, of messages received from message parser 120. In some cases, message-related information includes metadata associated with a message, such as the time a message was received or distributed, or the recipients or conditions related to distribution. Message-related information is received by a message data store (e.g., message data store 124) from management server 126 in an embodiment. Message data store 124 can be searched, queried, analyzed, or used for verification or planning purposes in embodiments. For example, message-related information may be used to determine the effect of incidents, construction, weather, traffic or other conditions, or to analyze data associated with mobile devices.

Distribution-decision engine 122 is discussed below in more detail with respect to FIG. 2. Decision engine 122 utilizes user-profile data and location data associated with a device (e.g., location data 128 from device 140 in FIG. 1) in an embodiment. User-profile data can be received from a user-profiles data store 132. For example, the user-profiles data store is capable of storing contact information, user identifiers, device identifiers, routes, plans, programmed requests, settings or alert statuses associated with mobile devices, such as device 140.

In exemplary embodiments, a particular device-type is associated with a vehicle or account, and additional information regarding a device may be stored in user-profiles data store 132. The user-profile data may be obtained from a device (e.g., device 140), users, databases, Internet locations, or third-party sources. As discussed below, user-profile data is used to configure or format an alert, such as alert 134 in FIG. 1, in embodiments of the present invention. User-profiles data store 132 may be referenced upon a change in conditions or location to configure, format or re-format alert 134, or to withhold or terminate alert 134.

Alert constructor 138 can be embodied on a separate computing device, or included on one or more computing devices that facilitate receiving component 118 or management server 126. In one example, alert constructor 138 is remotely connected to a server that distributes alerts to computing devices. As shown in an embodiment in FIG. 1, management server 126 is configured to communicate with alert constructor 138, user-profile data store 132, and distribution-decision engine 122. Additionally, in an exemplary embodiment of the present invention, management server 126 is configured to receive location data 128 associated with a computing device, such as device 140.

Management server 126 communicates with remote computing devices, such as device 140. The illustrative embodiment in FIG. 1 shows that management server 126 receives and distributes alerts intended for device 140. Additionally, management server 126 receives data from device 140 that is intended for distribution-decision engine 122 (or user-profiles data store 124). In other embodiments of the present invention, these functions may be performed on one or more individual computing devices. For example, in an embodiment, a first dedicated device administers or manages location data associated with a device, and a second dedicated device receives and distributes alerts to a device. Alert 134 can be received at a device 140 as data (including one or more data packets), or as a signal, file, tone, or an indication for action by a mobile device, such as activating a local tone or alert.

The relationships and/or communication among the components and devices in FIG. 1 is shown to illustrate embodiments of the present invention, and does not indicate a direct, immediate, permanent, or physical relationship is required. In one example, a remote computing device (e.g., device 140) communicates with management server 126 by using a base station and accessing a mobile network. In one embodiment, the user of device 140 downloads, permits, or accesses an application on device 140, shown as application 142, or, alternatively, application 142 can be available automatically, as part of another application or program, or added by a network administrator, service provider, or pursuant to regulations or safety procedures.

Application 142 enables management server 126 to obtain information from device 140 over an Internet or mobile telecommunications network, satellite network, or other connections that are used to send or receive information in accordance with embodiments of the present invention. In one embodiment, location data or other data associated with a device is obtained by a management server (e.g., management server 126) from another source, such as a network location that logs data associated with computing devices.

In embodiments of the present invention, computing device 140 includes a software application, such as social-networking application 144. Application 144 may be in communication with social-networking site 146, which may be located at an Internet address. Computing device 140 is capable of receiving update 148 from social-networking site 146, and providing post 150 to social-networking site 146. Mobile computing device 140, or other devices within a vehicle, may be equipped with software that performs text-to-speech functions.

As stated above, traffic information 110 is provided by one or more sources, such as transportation authority 114A. Traffic information 110 that is from, or approved by, transportation authority 114A may be organized or managed by intermediaries (not shown) before receipt by message generator 112. For example, a clearinghouse or accessible database can store authorized traffic information 110. In one case, an official entity approves certain traffic information 110 that is eligible for distribution.

Traffic management center 114B may provide traffic information 110 that is distributed to vehicles in accordance with embodiments of the present invention. TMC 114B can be an application that is used by systems to provide certain information, such as traffic incidents and congestion. Additionally, TMC 114B can aggregate messages from multiple sources. In some cases, messages from TMC 114B are intended for broadcast at an FM radio frequency.

Traffic information 110 can include information associated with ITS 114C, such as signs, advisory highway radio signals (such as ISS Highway Advisory Radio), or cameras. Traffic information 110 can mirror, or be a substantial copy of, traffic information broadcast by the ITS to another entity, device, subscriber or location. Traffic information 110 is conveyed in real-time or retrieved from a database associated with ITS 114C, or from a temporary store or cache of traffic information 110, in some cases. Traffic or transportation information 110 includes information associated with electronic toll collection, emergency vehicle notification systems, collision avoidance systems, traffic lights, weather data, traffic law monitoring and enforcement, and other emergency information that may affect travelers, such as AMBER alerts.

Traffic information 110 can also include input from the citizenry, e.g., users of other mobile computing devices, as shown by individual input 114D. In an example, an individual witnesses a traffic event, such as an accident, congestion, or icy roads, and inputs this traffic information 110 into a mobile device, such as device 140. The traffic information 110 can be input into an application associated with an Internet website, for example, social-networking site 146.

Traffic information 110 can also include device-specific information obtained from mobile devices (e.g., device 140), in some cases through an application without direct input. In other cases, an application, file, or transmission of device-specific information is enabled through a registration or sign-in process. Access to device-specific information can be granted at any time, in order to facilitate real-time data collection.

Position information that is derived from mobile devices can be used as traffic information 110, or to confirm or configure transportation information that is distributed in accordance with the present invention. Embodiments use locations or speeds to determine traffic events. For example, a mobile device may be in a vehicle that is traveling slowly due to a traffic event. The speed of the device, such as device 140 in FIG. 1, is used in combination with an ITS device, such as a sensor or camera, to determine a traffic event occurred, or to determine that a traffic-event notification should be distributed (or not distributed) to mobile devices in the vicinity of the event.

Location data 128 may be received from device 140 at fixed or variable intervals, for example a heart-beat interval, or based on a pending message or alert, or polled, in embodiments of the present invention. For example, location data 128 is requested, obtained, or accessed in order to provide information to the distribution-decision engine. The launching or use of an application or Internet connection may provide location data 128, or location data 128 may be provided based on changes in conditions or locations, for example a change in speed or distance above a threshold value. User-controlled settings, network coverage, or detection by another device can cause location data 128 to be communicated to a server, such as management server 126 in FIG. 1. Location data 128 can be obtained or used in real-time, or stored or logged for future uses, in some cases for future uses within a set time period or before a change in conditions.

Users of mobile devices are able to request or receive alerts containing travel information from Internet sources, including websites, such as a social-networking site 146 in FIG. 1. In an embodiment, an update 148 is received from the social-networking site 146. Update 148 includes at least some traffic information 110 and/or alert information for distribution to the device 140, and update 148 can be configured for distribution in accordance with embodiments of the present invention.

In some cases, update 148 includes a tag, or metadata, indicating certain configuration, format, priority, or other distribution criteria, for use with update 148. By way of example, and with reference to FIG. 1A, an illustrative special tag 160 is shown. This tag could be interpreted by social-networking application 144 so that any update having this tag would be orally presented by way of mobile device 140. For example, say tag 160 was "origin: govt authorized," as shown. Only after satisfying a certain process could an entity (poster) obtain a ability to have its updates includes this tag. Illustrative entities include State Departments of Transportation or the Secretary of Transportation of the U.S. or some other jurisdiction.

In one embodiment, all posts made by authorized entities include tag 160. In other embodiments, inclusion of tag 160 is optional. But whenever a presenting application (such as social-network application 144) encounters tag 160, it presents the update 162 (such as the conveyance of an Amber alert) in a manner different than presenting normal updates in some cases. For example, the default option might be to visually convey updates in a status-update string. But updates that include tag 160 would be read aloud by the application 144.

Alerts may include tags to only be delivered when text-to-speech technology is available, either on device 140 or another, connected device (e.g., a car speaker or cellular-phone headset). The option to convert messages to speech by at least one device within a vehicle can be used to determine that an alert will be sent to any device in the vehicle. For example, various device-characteristics, such as a headset connection or an application to convert text, may be determined in order to preserve a hands-free environment.

In another example, update 148 indicates an authorized source of traffic information, an urgency or relevancy level, or other feature of the alert. Update 148 is formatted according to a certain type of update (e.g., electronic message, instant message, audio, automatically-opened), or visual presentation, such as color, size, bolded or underlined status, or placement (e.g., overlay, location on a user-interface or in an inbox). In still another example, tag 160 indicates that an update includes information that was not distributed directly to a mobile computing device, such as device 140.

If device-speed prevented rules engine 122 from determining that an alert would be sent to a mobile device 140, the information from that alert may be included in an update 148 from an Internet site and indicated as such. In embodiments of the present invention, application 144 that is associated with device 140 can be used to retrieve or accept route information, trip plans, or user preferences. In an embodiment, device information is obtained when application 144 is opened or used, or when information is saved to an application 144.

Figure 2:
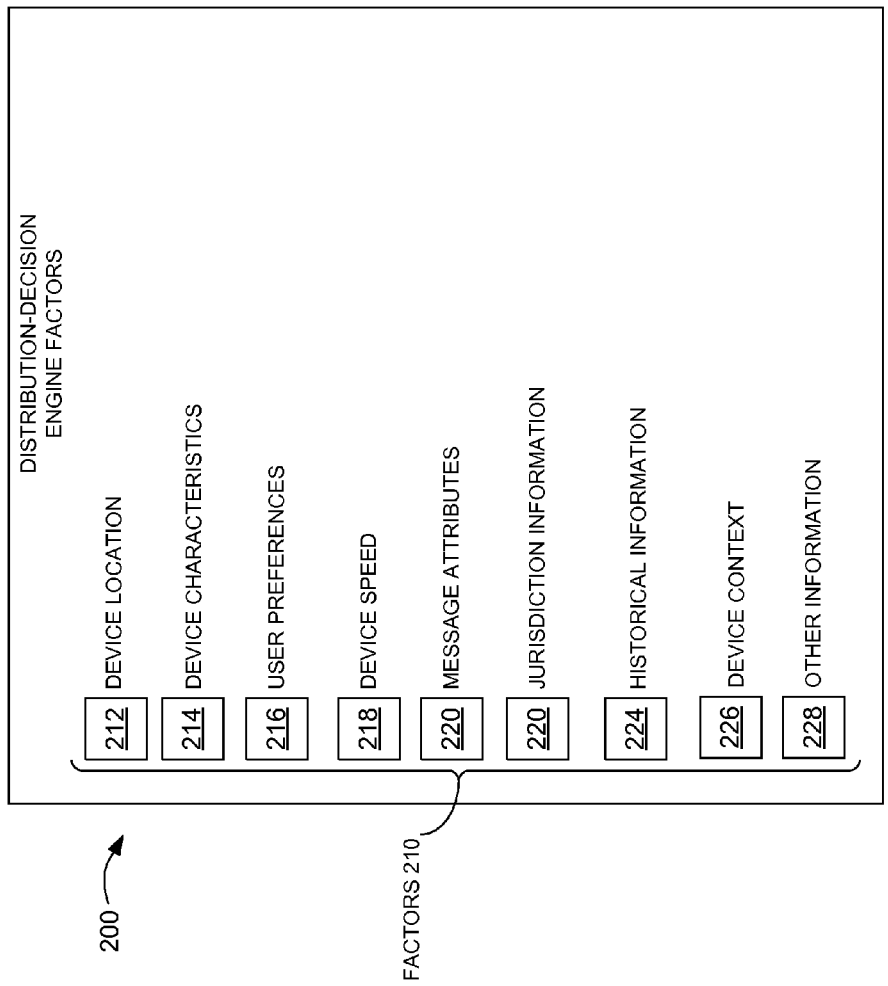
FIG. 2 is a diagram illustrating exemplary distribution-decision factors used in accordance with embodiments of the present invention.

FIG. 2 depicts illustrative factors 210 that distribution-decision engine 122 considers when deciding to configure or convey an alert to a specific vehicle (through one or more connected devices in the vehicle). Factors 210 shown in FIG. 2 are applied by the decision engine in order to manage, configure, or determine an action for a message or alert, including certain traffic or travel information derived or extracted from an initial message (e.g., initial message 116 in FIG. 1), in embodiments of the present invention, by affecting the distribution of travel information, or alerts. Factors can be applied by decision engine 122 to determine a message should be used to construct an alert, sent to a management server, distributed to mobile device 140, or to determine the configuration or format of alert 134.

Multiple factors 210 can be used by decision engine 122 to determine actions regarding travel information and alerts, and other, additional factors can be used by decision engine 122. The factors include current, or recent, data that is obtained from a device (e.g., device 140, a transportation device, or a sensor) prior to a determination by decision engine 122, in an embodiment. Embodiments also include using stored or archived data from a database, record, or source, such as regulatory information for a location (e.g., state or city rules). Stored data can be accessed and included with other traffic information any time prior to use by engine 122.

The exemplary factors 210 discussed here may be used individually, in combination with each other, or in combination with other factors or settings. In an embodiment, when one or more factors conflict or contradict each other, a programmed or default mobile-device setting can determine the outcome. For example, in an embodiment, a device is able to override or turn off one or more factors 210, or set priority levels of one or more factors 210.

Travel information, or alerts, are distributed based on a device-location factor 212 in embodiments of the present invention. In an embodiment, a device-location factor 212 is used by an application, such as decision engine 122, to configure an alert, including formatting an alert based on the locations of mobile computing devices. Embodiments of the present invention include devices, such as one or more servers, with application(s) capable of detecting, receiving, or accessing information associated with factors 210 from local or remote sources, including databases (e.g., user-profiles data store 132) and accessible devices (e.g., device 140). Device-location factor 212 is one of the factors 210 used by decision engine 122 to decide to take an action on an alert, such as holding, re-routing, terminating, restricting or flagging the alert, which may be effectuated and/or included as configuration information associated with an alert.

Locations of devices can be obtained or determined by remote sources. In an example, GPS technology is used to automatically locate computing devices that are associated with vehicles. An information system, such as a GIS, can provide and store location-information that is used to configure alerts. Location-information may include the results of calculations or other processes performed on positioning data by one or more computing devices.

An alert is configured or formatted as an audio alert based on the location of the device in embodiments of the present invention. For example, when a device is in a location where reading a text alert on a mobile computing device is prohibited, an alert is configured as an audio alert, and, if the device is unable to effectively receive audio alerts, the alert is delayed until a later time or a change in conditions, or sent to an alternate destination for future use. In another example, text alerts to devices can be prevented or delayed based on certain locations for safety of public-policy reasons. Specifically, a dangerous road, bridge, or other physical area can be detected and used to affect the distribution of alerts in embodiments of the present invention.

The device-location factor is used in combination with other information, such as weather or road conditions, or the surrounding traffic environment, in embodiments. In one exemplary embodiment, a mobile device travelling on a narrow bridge is able to receive text alerts in certain conditions (e.g., temperatures above the freezing level), but is only able to receive audio alerts in other conditions (e.g., temperatures below the freezing level), or is not able to receive alerts until a change in conditions (e.g., exiting the narrow bridge, stopping the vehicle or movement of the device, or temperatures rising above the freezing level). If the alert is not distributed after a predetermined period of time, or after a change in location over a threshold amount, the alert expires in embodiments of the present invention, and the alert may be terminated or re-routed.

Public alerts are distributed in accordance with a device-characteristics factor 214 in embodiments of the present invention. The device-characteristics factor 214 includes information specific to a mobile computing device 140.

Device characteristics are detected or received from one or more sources. In one example, it is determined that a device is of a certain type or model. A user of a device, or a third-party with information about the device, may provide this information to a stored user-profile.

An application on the device can provide information, such as a brand of hardware, or the presence of a feature or compatibility. Information can be made available from another source that provides features or characteristics of the device. Permission to access or view this information can be supplied upon registration or activation. In one example, a software application on a mobile computing device obtains permission to access information regarding the device, including information associated with a vehicle or planned route.

Device characteristics include capabilities or compatibilities of a device, such as an ability to automatically play an audio alert, in embodiments of the present invention. Other characteristics of a device considered as a factor can be speaker capabilities or settings, or communication capabilities (e.g., Internet, Bluetooth, instant messaging, alert tones, smart-phone abilities, electronic messaging, or hands-free), including detecting that the device characteristics are activated or enabled by the user, network, or service provider. As discussed above, the device-characteristic factor 212 is used in combination one or more other factors from a set of factors 210. In one example, where the device-characteristic factor 212 indicates an audio capability of a device, the device receives an alert it would not have received, based on one or more other factors, without audio capability.

Travel information, or alerts, are distributed based on user-preference factor 216 in embodiments. Examples of user settings include preferred message types, formats, lengths, languages, or volume levels for use in delivering or distributing alerts to devices. User preferences include configured routes or travel plans input by the user, or associated with the user and identified by an application. Embodiments of the present invention include periods of time that are preferred or set for receiving alerts include times of day, weeks, or other increments, or times related to scheduled events or other calendar information. A preference can be set to receive certain types of messages (e.g., traffic delays or AMBER alerts), or messages with certain priority levels (e.g., emergency alerts, alerts associated with travel plans in a particular time-frame, or alerts associated with locations within a certain distance of a user or route).

User-preferences factor 216 can include a combination of user settings, such as a time period, message type, and priority preferences. As a specific example, a preference is set to receive text alerts regarding one or more routes, between the hours of 8:00 AM and 9:00 AM, and, if audio alerts are used, to receive audio alerts at a medium volume level. An engine 122 can implement the settings, in addition to one or more other factors 210, to determine whether a text alert or audio alert will be distributed, or withheld from distribution.

Transportation alerts can be distributed based on a device-speed factor 218. Device-speed factor 218 can be derived or computed from position data associated with a device 140. The speed of a device can be obtained from, or based on raw data from, intelligent transportation systems devices or other sources of location and/or movement data. Device speed can be determined by proximity of the device on a roadway where an agency is tracking speeds of multiple vehicles. Device-speed indicates movement, including a velocity or acceleration associated with a device, and including current, recent, historical, or customary speed information for the device or location, or a combination or comparison of more than one value. For example, changes in speed, or variations from stored speed data, over a threshold value, may be considered in embodiments.

Alerts may be held from distribution based on device-speed information, as part of an effort to increase transportation safety, satisfy regulatory requirements or comply with other public or private rules. As an example, an alert, such as alert 134 in FIG. 1, is configured for distribution to device 140 if the device is travelling below a certain speed. In another example, the alert 134 is configured for distribution as an audio file to the device 140 when the device is moving above a speed, with a certain amount of variation in speed, or with a certain amount of variation from surrounding traffic or a recommended speed.

In an embodiment, alerts directed to devices traveling in vehicles over a particular speed, such as 50 miles per hour, will be configured to be held until the vehicle travels below 50 miles per hour, or until a certain amount of time elapses (whereby an alert may be re-directed or terminated). In another example, a mobile device decelerating at a rate above a certain amount will not immediately receive alerts, or may receive alerts at an alternate, accessible destination. As described with respect to other factors 210, a device-speed factor 218 can be used in combination with other information from the device, such as device 140, or from transportation devices or data stores. For example, a device-speed, in combination with a user setting, can be used by decision engine 122 to configure traffic information.

In an exemplary embodiment, a first device speed is applied to filter messages of a first priority level, and/or messages associated with a time-period, such as messages relevant to a time-period more than twenty-four hours in the future. A public authority or regulation can set a second device speed that is applied to filter and/or configure certain messages, such as requiring an audio distribution or a delayed distribution. If the factors conflict, the decision engine 122 can determine a priority of factors indicated by the message, such as initial message 116 in FIG. 1, or the decision engine 122 can determine the priority of factors (e.g., factors 210) by comparing the factors to each other or to rules, policies, or practices regarding message distribution.

Travel information, or alerts, are distributed based on a message-attributes factor 220 in embodiments of the present invention. Message attributes include the type or subject matter of a message, such as traffic congestion, planned or ongoing repair or construction work, emergency notifications, AMBER alerts, or other types of messages in accordance with the present invention. Message-attribute factor 220 includes priority information regarding the message, portions of traffic information 110 included in the message, alerts, or factors (e.g., factors 210), that is used to configure an alert in an embodiment. For example, emergency notifications are configured to result in an audio alert that is immediately distributed to a device, while non-emergency notifications (for example, construction planned along a commute route more than a day in the future) are configured to result in a text alert sent after a certain time of day or after a condition changes, such as movement ceasing or reaching a location.

Travel information is distributed based on a jurisdiction-information factor 222 in embodiments of the present invention. Location information is used to determine a jurisdiction associated with a mobile device, such as device 140 in FIG. 1, in an embodiment. A message can include jurisdiction-identification information or regulatory information based on a jurisdiction. Jurisdiction-information factor 222 may reflect a prohibition on alerts, or a restriction on alerts at certain times, locations or conditions, such as heavy traffic or construction work. In an embodiment, jurisdiction information indicates only hands-free messages or alerts are to be distributed to devices.

Travel information, or alerts, are distributed based on a historical-information factor 224 in embodiments of the present invention. For example, previously-travelled routes, or a comparison of typical or archived travel information to current data, can be used to configure alerts for distribution. In an embodiment, an alert relevant to a route that is travelled with a certain frequency by a vehicle is generated for distribution to a device in the vehicle. In other embodiments, current conditions or device data is compared to historical data to determine an alert configuration. In one example, if a mobile device is travelling substantially faster than the device typically travels at a location, or faster than other devices typically travel at the location, then alerts for the device are configured to be held or distributed as audio alerts.

Transportation alerts are distributed based on a device-context factor 226 in embodiments of the present invention. Device-context information can indicate environmental conditions, such as surrounding vehicles, traffic density, or traffic conditions, in an embodiment. In an example, an alert for a mobile device is configured to be held from distribution, or to be distributed as an audio alert, based on an amount or proximity of other vehicles or devices. In a specific example, an alert is withheld based on the amount of space between a mobile device and another vehicle, where another vehicle is recognized based on a second device, or based on intelligent transportation information or devices. Device-context factor 226 can include road or weather information, or traffic patterns or situations, in an embodiment.

Travel information, or alerts, may be distributed based on other information, indicated at factor 228. One or more other considerations include additional information, such a user's or a vehicle's driving record or history, or setting imposed based on this information (e.g., insurance-company rules for distributing alerts). Other information may be associated with one or more devices that are associated with a vehicle, such as device 140 in FIG. 1, and other information may be obtained from third-party or network sources. Public policies or plans, including studies, experiments, evaluations, or goals regarding transportation systems or coordination can be used as other information at factor 228. In embodiments of the present invention, the factors, (e.g., factors 210 in FIG. 2), rules, results, or effects on messages or alerts, determined or applied by an engine, such as decision engine 122, may be implemented by the alert constructor 138 or management server 126.

In other embodiments, one or more other factors 210 may take precedence regardless of default settings or user preferences. Distribution-decision engine 122 determines how to apply more than one factor from a set of factors, such as factors 210, based on priority levels in an embodiment of the present invention. The decision engine 122 determines the priority levels of factors 210, and factors 210 and the associated priority levels are dynamic in embodiments of the present invention.

In a specific example, a mobile device is set to receive an alert, even where the speed of the mobile device indicates the alert should not be distributed at that time (although it may be held for distribution upon detection of a slower speed or lapse of time). In this example, the mobile device may not receive an alert when the location of the device indicates surrounding construction work, or nearby construction work in combination with a certain speed of the mobile device. In some cases, factors 210 include a certain priority, rank or treatment that must be applied by the decision engine 122. In these cases, only the one or more factors will be applied and the detection of the remaining factors will be prevented or ignored. As an example, in a certain area (or for a certain user or device), the decision engine 122 must apply a factor regarding the density of traffic surrounding a device, and the decision engine 122 ignores data regarding the settings of the device.

Figure 3:
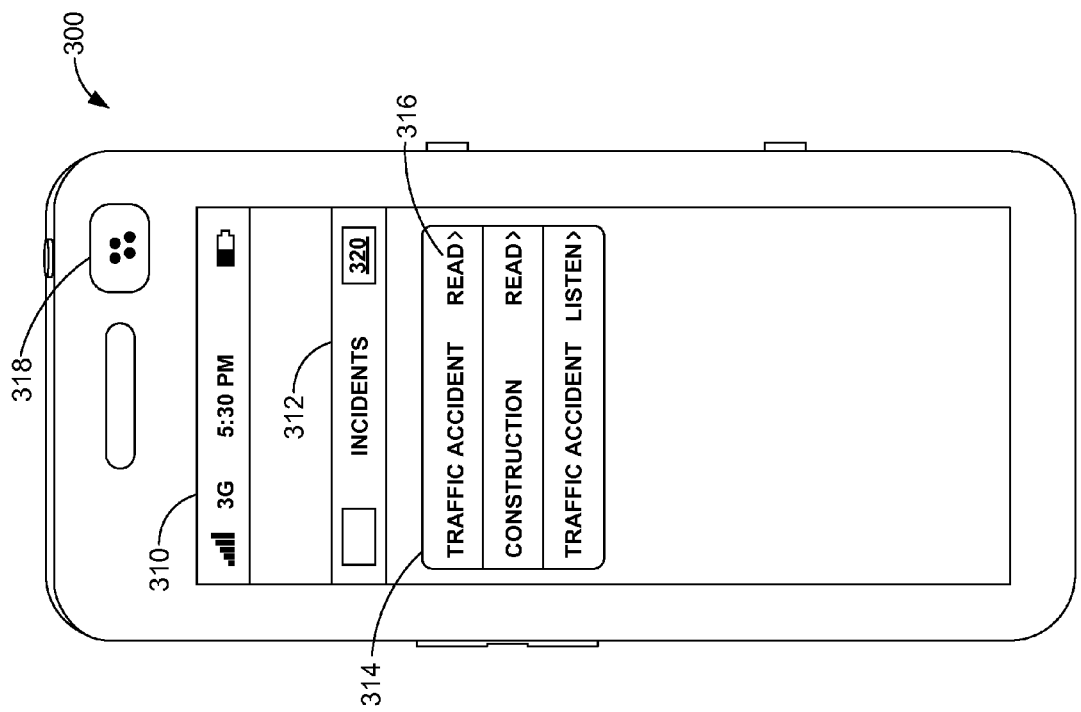
FIG. 3 is a diagram illustrating an exemplary device suitable for operation of an embodiment of the present invention.

FIG. 3 shown an exemplary remote computing device, designated generally by reference numeral 300 ("device 300"). The device 300 includes a user-interface 310 that presents or displays alerts, or options to view or hear alerts. User-interface 310 includes an alert-indicator view 312 that indicates an application or alert menu. One or more alerts 314, or indications of alerts received or available for receipt, are shown in FIG. 3, and include an alert selector 316. The selector 316 can cause an alert-viewing window to open, or an audio, video, or multi-media file to open. For example, alerts 314 are able to be read as text alerts or played as audio alerts, and a device 300 can present the available formats or types of alerts for selection, including an audio indication that voice commands are functional. In other words, a sound may convey that the device is receptive to verbal instructions, including a command to play an alert.

Types of alerts can be temporarily disabled or locked, based on one or more factors 210. In a specific embodiment, a text alert is disabled due to the application of a factor, such as the speed of the device or the surrounding traffic conditions, but the audio alert is available on the device 300. In some cases, no alerts are immediately available at the device 300, based on one or more factors, including the priority level of one or more factors. Alerts 314 that are not available at one point in time are presented or enabled (i.e., made accessible) by changes to factors associated with the alert, such as factors 210 in FIG. 2.

Specific hardware, such as speaker 318, is used as a device-characteristic factor 214, discussed above, and the settings or functionality (including both the default or expected hardware capabilities for the device, and the actual, functioning hardware capabilities of the device) are detected and considered in embodiments. An option 320 is provided that may be selected to begin a process of inputting user preferences, device characteristics or travel information, such as plans, routes, or GPS inputs, either directly or through access to a separate program or application.

Embodiments of the present invention enable the entry of traffic information that is combined with time and location data, and used with other traffic information (e.g., from a TMC), to provide alerts to other devices. The alerts for other devices may be configured for safety. For example, real-time information regarding the other devices is used to configure or format the delivery of alerts. More specifically, an alert can be delayed or transmitted audibly based on a device's motion, or based on other characteristics of the vehicle associated with a device. All use-case scenarios are too numerous to discuss here, but several exemplary embodiments are discussed below. The examples included herein are not exhaustive, but are provided to illustrate embodiments of the invention.

Data associated with devices and locations can change over time. For example, the speed and position of a mobile computing device changes. Embodiments of the present invention obtain real-time data regarding computing devices, and the locations and vehicles associated with devices. Real-time data indicates relatively current or recent data regarding a computing device, such as positioning data obtained using a GPS or other PNT systems, speed values or calculations, locations, settings, or other sensor readings, such as temperature and proximity. Data collected in real-time can be a location and/or current conditions of the location (e.g., a city and the city's policy regarding traffic alerts).

In one case, a first vehicle is traveling on a planned route with a recognized cellular phone in the vehicle. The cellular phone may be a device such as device 140 in FIG. 1. Other devices in a vehicle, through wired or wireless communication, can cause recognition of the cellular phone, as discussed with respect to FIG. 3. The route may be input into a software application. Updates regarding the route may be requested, or generated based on real-time travel on the route. An accident occurs on the planned route, approximately three miles further along the route than the first vehicle. In one embodiment, notification is received from a TMC, and a message is generated regarding the accident. One or more channels for traffic messages can be aggregated and/or used as sources of traffic-information.

Traffic information can include direct detection of the accident, or the aftermath of the accident, including information obtained from a device in a second vehicle. The device (e.g., device 140) receives input regarding the accident (orally or textually), and this information is used as traffic information to create an alert for the first driver. As a safety consideration, textual input can be blocked when a device is moving above walking-speed, but oral inputs of traffic-information are enabled. In an embodiment, the device in the second vehicle uses a recognized speech-command to activate submitting the information. Drivers may speak the location of an accident, or indicate an accident while relying on the location-detection abilities of a computing device (for example, through a cellular phone in communication with a headset and a GPS device).

In another case, two vehicles that are associated with mobile computing devices are not on a planned route, but it is discerned that a first vehicle is traveling behind a second vehicle, along a certain road or in the same direction. In this case, it may be determined that the first vehicle is likely to encounter the same location or traffic event as the second vehicle, based on location and/or movement information. The second vehicle decelerates due to an accident. This information may be used, alone or in combination with other data about the accident, as traffic information 110.

An audio alert can be automatically played by a computing device in the first vehicle, such as a cellular phone or radio. If the first vehicle is moving, or within a certain distance of the accident, the first vehicle receives an audio alert about the accident. In this case, the first vehicle would not receive any text or menu options regarding the accident. For example, where it is determined that a hands-free earpiece is in use, an alert is delivered. In another example, all devices that are within a certain distance of the accident or congestion, that are also moving towards the accident or congestion, are eligible for the alert, but alerts are only sent to the subset of devices that capable of receiving text-free alerts. In one case, a plurality of devices in one vehicle are eligible for the alert and capable of receiving text-free alerts. In this case, a preferred or default device can be identified among the plurality of devices in the vehicle.

In one example, an emergency-response vehicle includes a form of communication, such as a radio and/or a mobile device with positioning capabilities. The arrival of the vehicle at the accident can be used as traffic information. In one case, after an emergency response to an accident at an intersection, vehicles near the intersection receive an alert. The alert is automatically forwarded or received by a head-set device, to facilitate audio delivery, in an embodiment. In one example, the vehicles within two miles of the intersection that are approaching the intersection receive alerts, if the vehicles are equipped with a mobile device that has speech-conversion technology.

In another example, vehicles that are associated with the intersection through a designated route receive alerts, and, if the vehicles are moving, the alerts are hands-free. If some vehicles are associated with computing devices that do not permit hands-free alerts, then the alerts can be delayed (until the vehicle stops moving) or sent to an alternate destination. In a specific example, a first vehicle crosses the intersection as part of a planned commute to a work-place. The route is registered using a software application, and relevant alerts that are authorized by transportation authorities are requested. In some cases, contact information can be input, such as email addresses or phone numbers associated with computing devices. The types and features of the computing devices can be entered or registered, or detected, obtained and/or verified by third-parties. For example, third-party sources are consulted for mobile-device information, such as location, speed, and hands-free capabilities, in embodiments of the present invention.

The same traffic information that is posted or reported to other outlets can be used to create alerts. For example, a traffic sign is along an expected route for a vehicle. When a cellular phone inside the vehicle is not moving, an electronic message that is based on the same information used by the traffic sign is sent to the cellular phone. A transportation authority can direct traffic information intended for traffic signs to certain vehicles in audio form. A posted or broadcast warning, such as an AMBER alert, can be pushed to mobile computing devices in a certain area. For example, when an AMBER alert is issued for an area, the vehicles in the area that are equipped to receive audio alerts immediately receive an audio alert. In another example, only the vehicles in the area that include audio-capable devices, and that also subscribe to AMBER alerts (or all local traffic alerts), immediately receive an audio alert.

In one example, a first vehicle and a second vehicle are near each other on a road. This may be determined by GPS data, smart-vehicle technology, or other indications of vehicular proximity. Due to safety concerns, an alert intended for both the first and second vehicles is staggered, meaning an alert it is received by the two vehicles at different times. The alert can be sent to a faster or slower vehicle first, or it can be sent to the vehicle further along the road in the direction of travel. Textual and/or audio alerts can be staggered among numerous vehicles and distribution times to reduce risks associated with multiple, nearby vehicles receiving alerts. In some cases, alerts are sent to mobile devices in the possession of passengers in vehicles, or to alternate mobile devices possessed by the driver (e.g., an email account associated with a laptop).

Turning to another case, a street is closed off due to a festival. A local official may provide traffic information that indicates the festival will affect certain streets. Hands-free alerts that are based on this traffic information can be sent to vehicles near the festival or within city limits. In other cases, input to a software application is used to select a vehicle for receipt of an alert. For example, a subscription or agreement associated with a mobile device can be used to determine that an alert will be sent. In a specific example, a user of a mobile device requests certain traffic information and supplies certain information (for example, contact information and travel plans). In another example, a mobile device is associated with information stored or provided by a third-party and permission to access that information. In some cases, a combination of profile data, such as a phone number, and third-party data, such as positioning data, is used to configure an alert for audio delivery.

In one example, the festival was not expected to cause closings or congestions on certain streets more than a mile away. Real-time traffic information indicates that the festival is, in fact, affecting certain streets, and the alert's content or distribution is affected by the real-time information. In this example, a vehicle traveling on or near the certain streets receives an alert. The alert is routed to an audio-capable device in the vehicle because the vehicle is in motion, above a particular speed, near another object, or within a certain distance of the affected streets. In another example, other transportation vehicles cause closings or congestion, such as trains, buses, or boats causing street closures (i.e., streets raised to permit water traffic).

In some cases, it is determined that a computing device is traveling at a slower speed than expected. In one example, a first vehicle travels a normal route to work. Upon arrival at work, the first driver indicates the route took longer than expected. Alternatively, an application indicates the first driver completed the route. This real-time feedback can be used as traffic information. In one example, the first vehicle's delay is used to generate alerts that are only sent to other vehicles that have not begun using the route that morning. This example uses real-time information associated with the other vehicles to configure alerts (i.e., to avoid unnecessary or unhelpful alerts to vehicles on the route or on alternate routes).

In another example, a lane on a road is closed, due to construction or damage. An authority may designate the lane as closed, or a crew-member or employee may physically indicate the lane is closed. This information can be input as traffic information, or it can be detected by intelligent devices and used as traffic information. In one example, physical devices, including warning signs, that are associated with the closed lane can communicate or detect location-data. In some cases, a vehicle's behavior, such as a sharp swerve, can be detected and used as traffic information. Certain vehicle behaviors (as indicated by a computing device associated with the vehicle) can indicate traffic events, such as ice, floods or traffic congestion.

An emergency response to a traffic event can be used as traffic information. In one example, more than one nearby mobile computing devices indicate that more than one vehicle has pulled over and stopped. This can indicate, or be used with, an emergency response, such as an ambulance with sirens passing the vehicles. In some cases, a traffic event occurs, such as an ambulance responding to an injured driver at the scene of an accident. Embodiments of the present invention collect real-time data from vehicles to determine the accident's effect on the vehicles, or to determine if the vehicles have encountered, passed, or avoided the accident. Real-time data from mobile devices associated with vehicles is also capable of determining whether the vehicles receive alerts at all (e.g., if a vehicle is approaching the accident and/or capable of receiving hands-free messages). In some cases, real-time data about other devices in a vehicle is used, such as connectivity to hands-free devices, including headsets or other devices with speakers. Real-time data is also capable of determining the format of the alerts (e.g., textual if a vehicle is stopped at a non-road location, meaning not in traffic).

Current data can be used to determine a location and a policy for the location. For example, a first state permits the delivery of textual messages to vehicles, while a second state prohibits them. Data can show if a vehicle is in the first state or the second state, and data can indicate the policy of either state. In one embodiment, a vehicle currently located in the second state. A database is accessed to determine the second state only allows audio alerts when vehicles are moving above a predetermined speed. In this embodiment, the real-time location and speed, and a source of regulatory information, are used to configure an alert as an audio alert.

Policies or alert-preferences can vary by state, city, jurisdiction or any defined area, such as a school zone, evacuation areas, or high-traffic location. Such rules may be stored in a remote or local database, or retrieved and included with traffic information and/or initial traffic messages. For example, during severe weather in an area, the computing devices in the area receive alerts that are automatically-played as audio files. In some cases, the alerts are configured to only be communicated as speech (using, e.g., text to speech conversion technology). The alerts may be held prior to delivery, until an appropriate speed or condition is met, by an application on the computing device.

In embodiments, a city, town, or neighborhood can request audio transportation alerts be used for vehicles within the respective locations. For example, a residential subdivision votes for non-textual alerts because of small children living in the subdivision. When vehicles are in the subdivision, transportation messages will be delayed or converted to audio format, depending on the capabilities of computing devices in the vehicle, including hands-free headsets. An alternate destination (such as an email address) can be used to indicate messages that were delayed or re-routed for safety reasons. Messages can include tags that verify the messages are authorized by a transportation authority.

In one instance, a vehicle enters a highway that is designated as a high-risk, or accident-prone, area. This may be determined by criteria such as the speed limit, use (e.g., commuter or special-event uses), or historical data (e.g., weather or accidents-per-driver). Within the designated area, the vehicle only receives audible alerts, regardless of the vehicle's speed. In other cases, the vehicle receives only audible alerts in the designated area when the temperature or visibility-level is below a certain value. In one embodiment, all alerts for the vehicle are held (before delivery or by an application on a mobile device in the vehicle) until the driver has left the high-risk area. A transportation authority can designate areas, based on events such as accidents, traffic behavior, weather or scheduled events (e.g., parades, games, maintenance, etc.).

In one example, a major sports event is planned and the local government has authorized closing a street that is expected to have increased pedestrian traffic during the event. The event, and the decision to close the street, constitute traffic information that can be safely relayed to vehicles in accordance with embodiments of the present invention. In one example, a transportation authority approves the street-closing, which triggers alerts to be distributed to affected vehicles. A first vehicle may subscribe to alerts regarding the closed street, or the first vehicle may be on or near the closed street.

The transportation authority is able to deliver non-textual messages to the appropriate vehicles, such as vehicles attending the sports event, travelling to work near the sports event, or traveling on the closed street. In a specific example, a first vehicle is connected to the transportation authority through an Internet site, and the first vehicle receives a configured message from the transportation authority. If the computing device that receives the message is traveling above walking speed, then the configured message is converted to audio form. If the message detects that the device can not convert the message to an audio format, then an application may hold the message for delivery until the device is traveling at walking speed or not traveling.

In embodiments, characteristics of an identified driver are used to block or format data. For example, in a first state, vehicles that are associated with drivers below the age of eighteen are only allowed to receive audio alerts. In this example, the driver's age and location (here the state where the driver's mobile computing device is currently located) are used to format alerts from transportation authorities. If the driver is eligible for an alert in the first state, but below eighteen years of age and unable to receive a hands-free alert through any device in the vehicle, the alert will be held. If the driver is below eighteen, but the driver's mobile device is wirelessly connected to a radio device in the vehicle that is capable of delivering an audio message, then an alert is distributed to the mobile device and safely relayed to the driver via the radio device. In some cases, instead of directly delivering the audio message, an audio alert indicates the presence of a message and the enabling of voice commands, so that a driver may orally choose to hear the message.

Device- and driver-characteristics can be used to prevent the use of visual user-interfaces associated with software applications. In one example, a driver is prohibited from inputting or reviewing traffic information in textual form when the driver is driving a vehicle. In another example, device-characteristics (such as speed, position, voice-command capability) and policies from a transportation authority (e.g., traveling over a certain miles per hour on a bridge in below-freezing weather) are used to disable any non-hands-free uses of applications. Drivers may use voice commands to initiate or enter traffic information.

Figure 4:
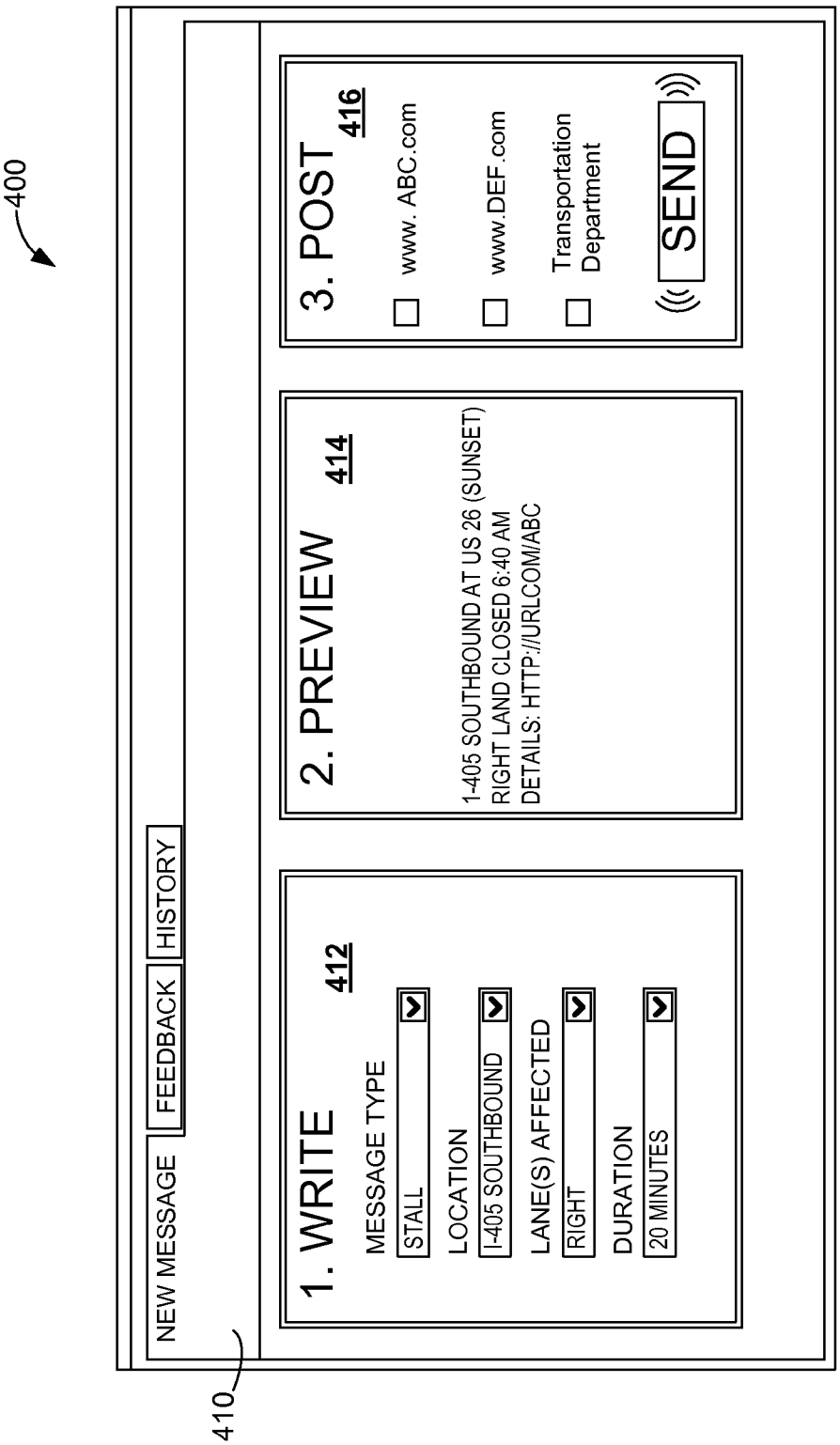
FIG. 4 depicts an exemplary interface suitable for operation of an embodiment of the present invention.

Turning to FIG. 4, an exemplary interface is shown, designated generally as 400. A new message view 410 can be selected. Section 412 enables the input of traffic information, including potential predetermined selections, which may be based on a route or recent travels (as indicated by recent positioning data), in embodiments of the present invention. As shown in section 414, a preview can be provided. Section 416 permits a message to be posted or sent. In one example, an application on a computing device provides an interface that is automatically associated with a certain destination for messages. Specifically, an interface can be configured to post to a default destination, such as social-networking site 146 in FIG. 1. A resulting post, such as post 150 in FIG. 1, can be received by an Internet application and used as traffic information 110.

Figure 5:
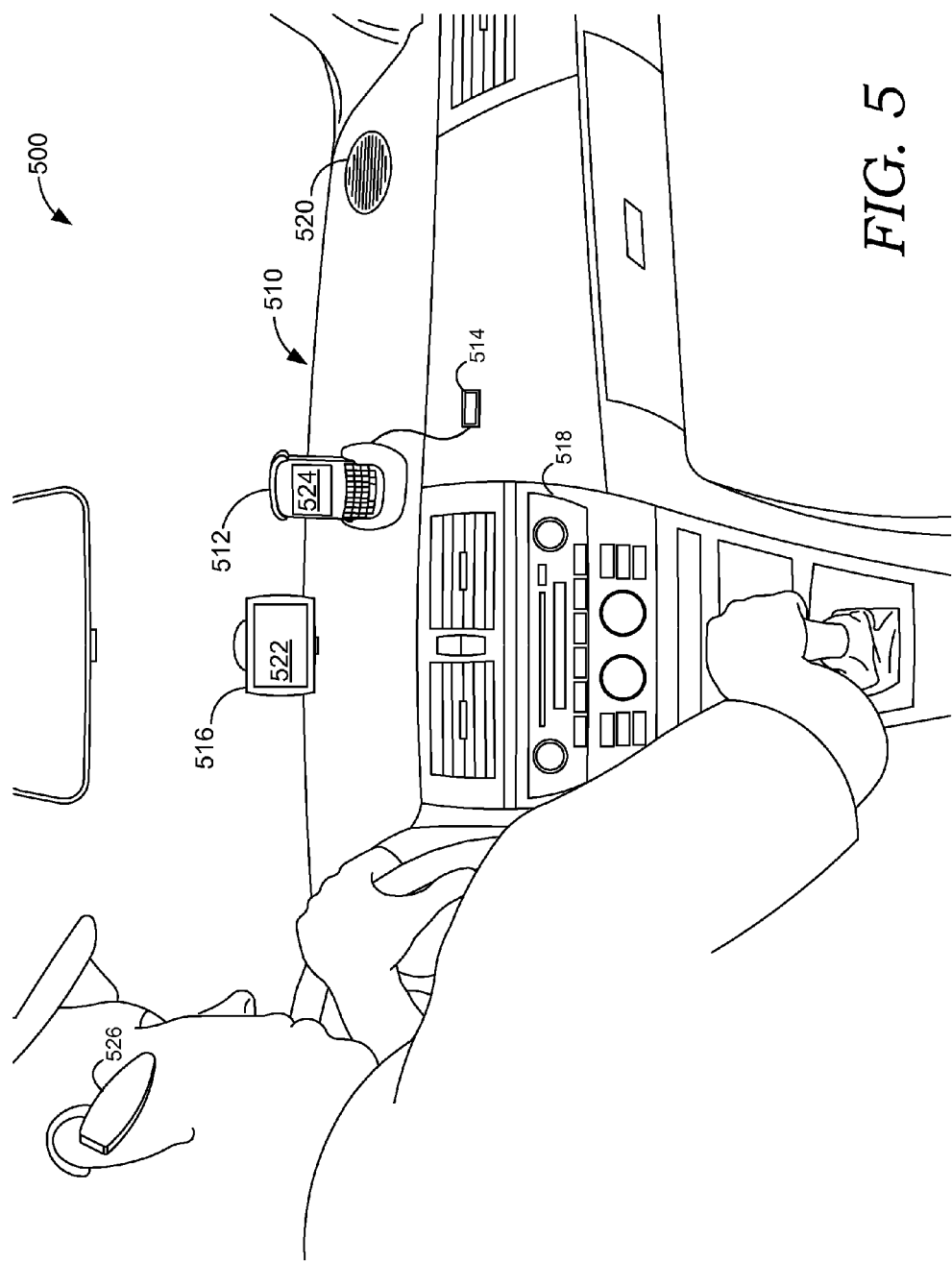
FIG. 5 depicts exemplary devices suitable for operation of embodiments of the present invention.

Turning next to FIG. 5, exemplary devices suitable for operation with embodiments are shown generally as 500. A vehicle 510 is shown, including a first mobile device 512. Mobile device 512 may be capable of emitting and/or converting audio alerts. Alternatively, supplemental device 514 can supply audio capabilities or text-to-speech technology, in order to present alerts received by mobile device 512 as hands-free alerts. Supplemental device 514 can be wired or wirelessly connected to mobile device 512.

A second mobile device 516 may also be connected to mobile device 512. In some cases, the first and second mobile devices are associated with each other, or the same vehicle or user, in a database. In another case, the devices are associated through shared positioning data, which may be determined after a minimum time period has passed. Second mobile device 516 may have audio capabilities that can be used by another device in the vehicle for presenting alerts.

In another example, a device that is part of the vehicle 500, such as radio 518, can be used to receive or present alerts. For example, a device in vehicle 500 can communicate an alert to radio 518 for audio delivery through speakers 520. In some cases, mobile devices 516 and 512 include interfaces 522 and 524, respectively. Interfaces 522, 544 enable the input, selection, or display of information in embodiments. Mobile devices 512, 516 can receive alerts that are intended for delivery as audio alerts. In one example, a mobile device directs an alert to head-set device 526 for audio delivery.

Figure 6:
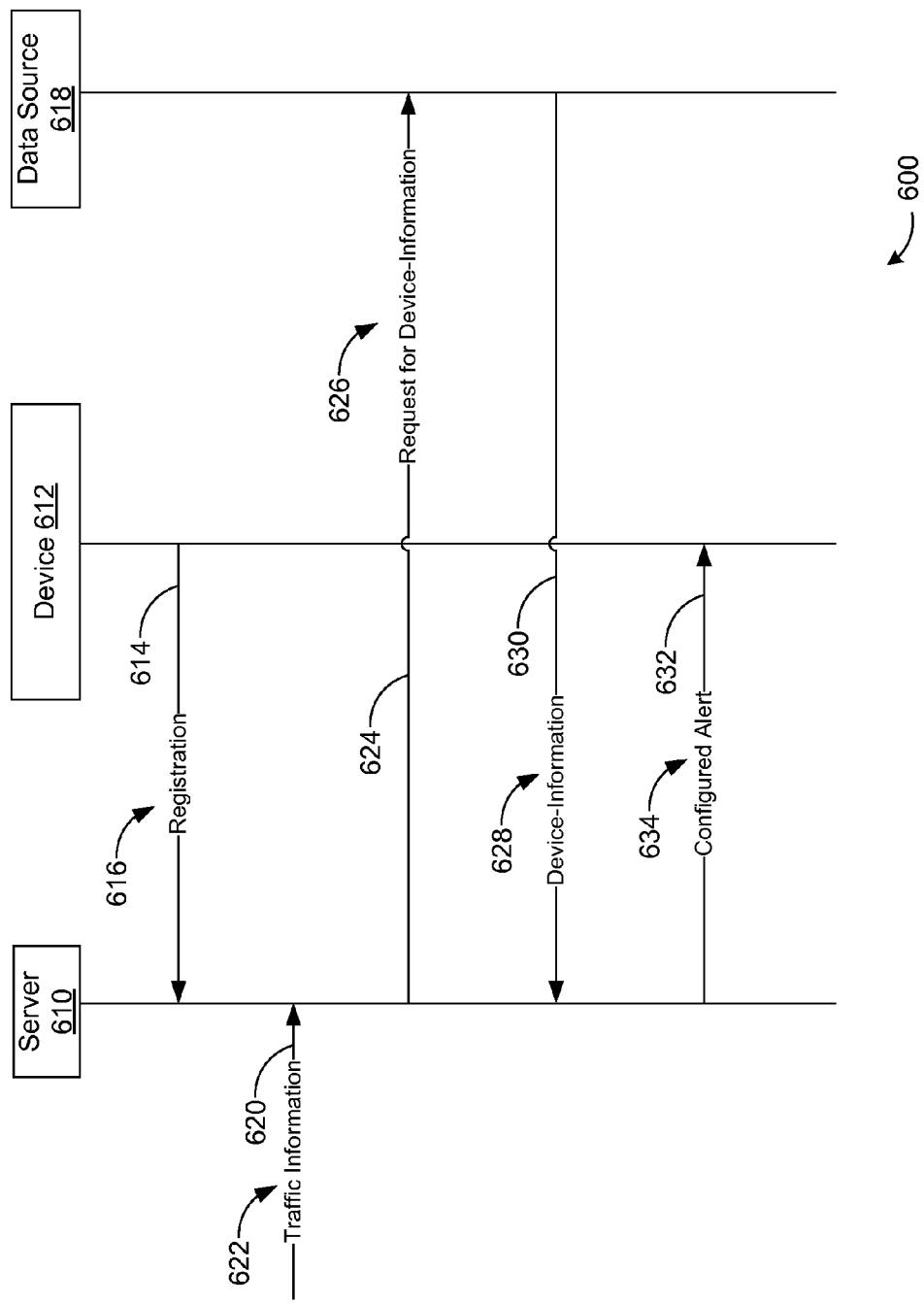
FIG. 6 is a diagram illustrating an exemplary method according to an embodiment of the present invention.

Turning to FIG. 6, a diagram of a method in accordance with the present invention is shown, designated generally by reference numeral 600. Server 610 is in communication with device 612. Step 614 includes a registration 616 of device 612. Registration 616 can include permission to access information that is provided by one or more data sources 618. Data sources 618 may contain information supplied by individuals, such as stored routes, preferences, or device-characteristics. In one example, registration 616 indicates that server 610 is authorized to obtain travel plans that were input into an Internet application and saved.

Device 612 can be in the vehicle during some, all, or none of the steps shown in method 600. In one example, for safety purposes, certain steps are only enabled when device 612 is stationary or moving at a walking-speed. At step 620, traffic information 622 is received at server 610. The traffic information used to create an alert can include data from a traffic management center. As shown at step 624, server 610 communicates a request for device-information 626 from data source 618. Device-information 628 is received by server 610 from data source 618 at step 630.

Device-information 630 can be used to determine that traffic information 622 is relevant to device 612. In an embodiment, data source 618 provides position-data regarding device 612. Device-information 630 can be used to configure the traffic-information 622 for delivery to a vehicle that is associated with device 612. For example, data source 618 may provide jurisdictional information that indicates the applicable policy regarding textual messages. As shown at step 632 in FIG. 6, a configured alert 634 is provided by server 610 to device 612. In some cases, device-information 630 is used to determine both the relevancy and the format of alert 634. A planned or travelled route, or position-data, may be used determine traffic information is relevant to the mobile computing device.

Figure 7:
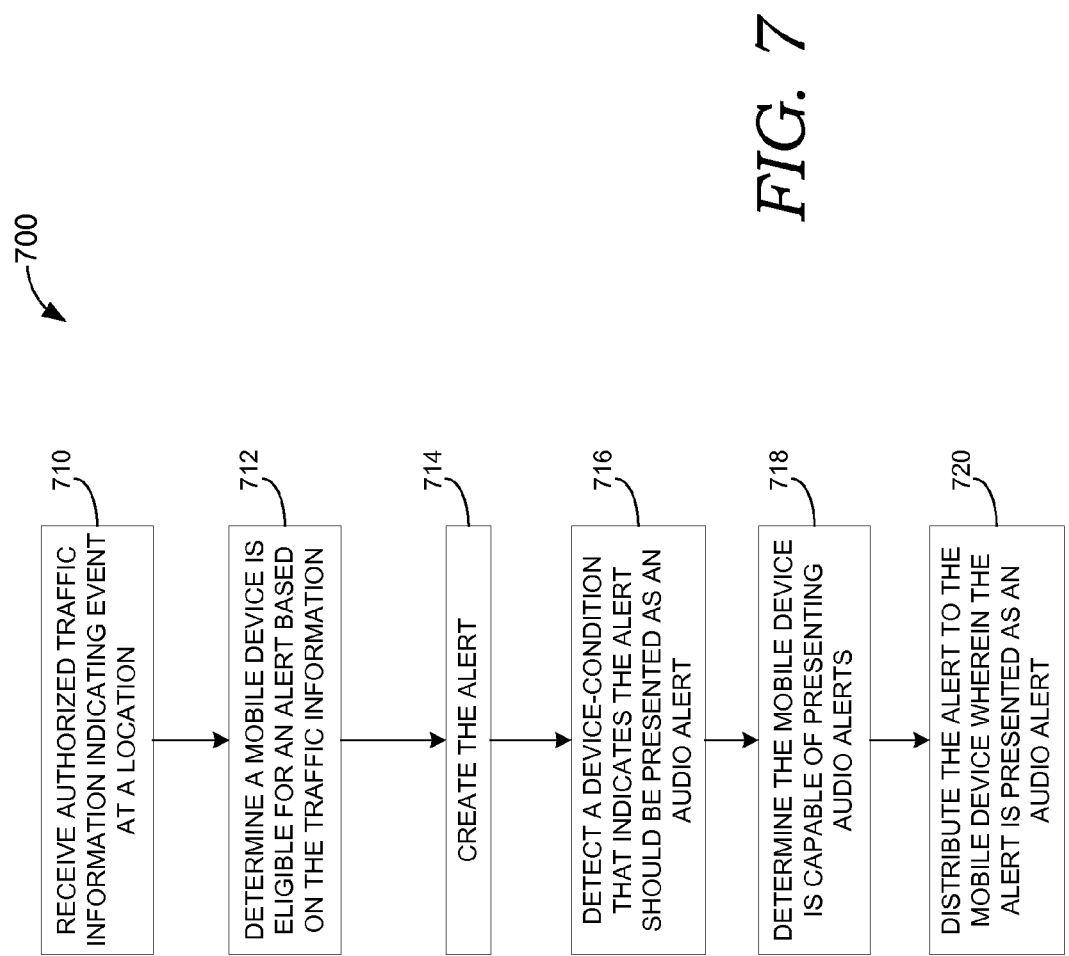
FIG. 7 is a flow diagram illustrating an exemplary method according to an embodiment of the present invention.

FIG. 7 is a flow diagram illustrating an exemplary method according to an embodiment, shown as 700. At step 710, authorized traffic information is received that indicates an event at a location. At step 712, it is determined that a mobile computing device is eligible for an alert based on the traffic information. An alert is created at step 714. As shown at step 716, a device-condition is detected. The device-condition indicates the alert should be presented audibly. For example, an audible alert may be required when the device-condition indicates a certain speed or situation associated with the mobile computing device. In some cases, detecting a condition includes accessing a remote data source. A grant of permission to access the remote data source may be input into an application and associated with the device. In embodiments of the present invention, conditions include the density of traffic, local rules or regulations, road conditions, or traffic conditions declared by transportation authorities.

At step 718, it is determined that the mobile computing device is capable of presenting audio alerts. Alternatively, it may be determined that the mobile computing device is connected to another device that is capable of presenting audio alerts. As shown at step 720, an alert is distributed to the mobile computing device and presented audibly. In an embodiment, the presentation of the alert includes converting textual information to an audio alert. Alerts may be automatically presented, in order to avoid any reading or selecting by users.

Figure 8:
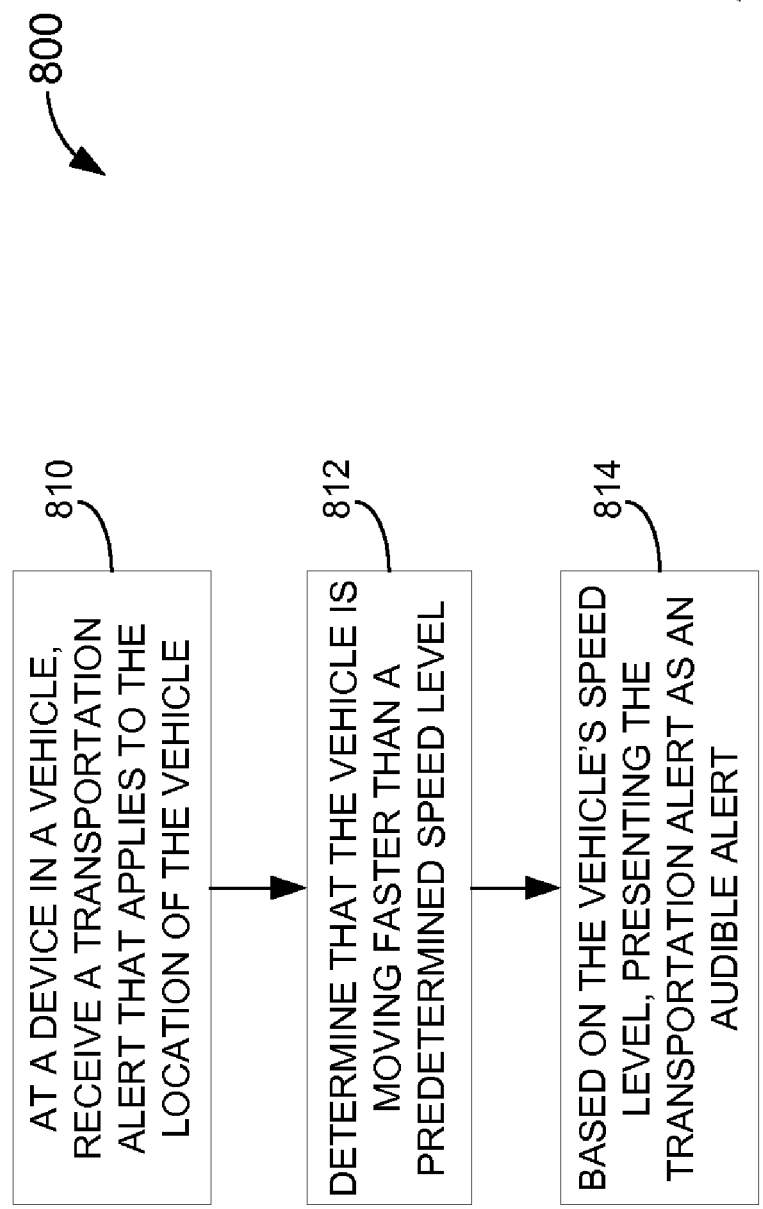
FIG. 8 is a flow diagram illustrating an exemplary method according to an embodiment of the present invention.

FIG. 8 is a flow diagram illustrating an exemplary method according to an embodiment of the present invention, designated generally as 800. A device, such as device 140 in FIG. 1, is associated with a vehicle. At step 810, the device receives a transportation alert that is relevant to a location of the device. It is determined that the vehicle is moving faster than a predetermined speed at step 812. As shown at step 814, the transportation alert is presented as an audible alert based on the speed of the vehicle.

In an embodiment, the transportation alert is authorized by a transportation authority. For example, the information contained in an alert may be provided by a TMC. A tag, such as tag 180 in FIG. 1A, can indicate the alert has been approved by an official entity. In some cases, a transportation authority is subjected to a verification process. Certain tags may be reserved for use with alerts that have been authorized by a credentialed transportation authority.

Many different arrangements of the various components depicted, as well as components not shown, are possible without departing from the scope of the present invention. Embodiments of our technology have been described with the intent to be illustrative rather than restrictive. Alternative means of implementing the aforementioned can be completed without departing from the scope of the present invention. Certain features and subcombinations are of utility and may be employed without reference to other features and subcombinations and are contemplated within the scope of the present invention.

The invention claimed is:

1. Computer-readable media having computer-executable instructions embodied thereon that, when executed, facilitate a method of distributing traffic information, the method comprising:
receiving traffic information at a server, wherein the traffic information indicates an event that is capable of affecting traffic at a certain location, and wherein the traffic information is authorized by a transportation authority for distribution;
determining that, based on its location, a first mobile device is a candidate to receive an alert that is based on the traffic information wherein said first mobile device includes an application;
creating said alert, wherein said alert includes a tag;
distributing the alert to the first mobile device, such that the tag is interpreted by said application so that said alert is capable of being presented in an audio format by the first mobile device.

2. The media of claim 1, wherein the traffic-event information includes data from a traffic management center, wherein the traffic management center is an application that can broadcast data using a radio signal.

3. The media of claim 1, wherein determining the first mobile device is a candidate includes obtaining position information associated with the first mobile device.

4. The media of claim 1, wherein determining the first mobile device is a candidate includes obtaining route information associated with the first mobile device.

5. The media of claim 1, wherein said alert is capable of being read out loud.

6. The media of claim 1, wherein determining that a first mobile device is a candidate to receive an alert is also based on accessing a remote data source.

7. The media of claim 6, wherein a permission to access the remote data source has been input into an application and associated with the first mobile device.

8. The media of claim 1, further comprising determining that the first mobile device is capable of delivering the alert as an audio alert.

9. The media of claim 8, wherein the first mobile device is capable of delivering the alert as an audio alert based on a wireless connection with an audio-enabled device.

10. The media of claim 8, wherein the first mobile device is capable of delivering the alert as an audio alert by automatically converting the alert from a text format to an audio format.

11. Computer-readable media having computer-executable instructions embodied thereon that, when executed, facilitate a method of delivering a transportation-related alert, the method comprising:
receiving a transportation alert at a computing device in a first vehicle, wherein the first vehicle is in a first location and the transportation alert applies to the first location, and wherein said alert includes a tag;
determining that the computing device is moving beyond a predetermined threshold speed level; and
based on said computing device's moving beyond said threshold speed level and based on said tag, presenting an option to receive the transportation alert as an audible alert via said computing device.

12. The media of claim 11, wherein the transportation alert is authorized by a transportation authority, and wherein the transportation alert is approved for distribution by an official entity.

13. The media of claim 12, wherein the transportation alert is associated with a tag that indicates the transportation alert is authorized, wherein the tag comprises metadata and wherein the tag has been reserved for use by the transportation authority.

14. The media of claim 12, wherein the transportation authority has been credentialed through a verification process.

15. The media of claim 11, wherein presenting the transportation alert as an audible alert includes directing a conversion of textual information to sound.

16. The media of claim 11, wherein presenting the transportation alert as an audible alert includes automatically emanating an audible alert such that a user of said computing device is not required to make a selection before presentation of the alert.

17. Computer-readable media having computer-executable instructions embodied thereon that, when executed, facilitate a method of configuring a traffic-related notification, the method comprising:
receiving information intended for distribution to a vehicle that is associated with a first alert-presentation device, wherein said first alert-presentation device includes an application that is associated with a social networking site;
receiving status information that describes a current status of said alert-presentation device;
generating a traffic alert based on said status information, wherein said traffic alert includes a tag; and
communicating said traffic alert to said first alert-presentation device, which is adapted to facilitate presenting said traffic alert, wherein said tag is interpreted by said application so that said traffic alert can be presented orally.

18. The media of claim 17, wherein said status information includes a speed indication that includes a current speed that said alert-presentation device is moving, and wherein generating said traffic alert includes configuring said traffic alert for audible delivery.

19. The media of claim 17, further comprising receiving user-profile data associated with said first alert-presentation device, wherein said user-profile data includes device-specific information.

20. The media of claim 19, wherein generating said traffic alert further includes generating said alert based on said device-specific information that is associated with said alert-presentation device, wherein said device-specific information includes a model of a said alert-presentation device.

* * * * *